United States Patent [19]

Calvert et al.

[11] Patent Number: 4,577,745

[45] Date of Patent: Mar. 25, 1986

[54] APPARATUS FOR ARRANGING ARTICLES IN GROUPS

[75] Inventors: Rodney K. Calvert, Dunwoody; Alton J. Fishback, Austell, both of Ga.

[73] Assignee: The Mead Corporation, Dayton, Ohio

[21] Appl. No.: 695,413

[22] Filed: Jan. 28, 1985

Related U.S. Application Data

[63] Continuation of Ser. No. 475,522, Mar. 15, 1983, abandoned.

[51] Int. Cl.⁴ .............................................. B65G 47/26
[52] U.S. Cl. ...................................... 198/420; 198/440
[58] Field of Search ................ 198/420, 425, 436, 440

[56] References Cited

U.S. PATENT DOCUMENTS

| | | | |
|---|---|---|---|
| 2,805,755 | 9/1957 | Jones ................................... | 198/420 |
| 3,255,863 | 6/1966 | Homan ................................ | 198/440 |
| 3,367,477 | 2/1968 | Leth .................................... | 198/398 |
| 3,469,673 | 9/1969 | Gentry ................................ | 198/440 |
| 3,635,322 | 1/1972 | Raudat et al. ....................... | 198/440 |
| 3,791,518 | 2/1974 | Vanderhoof ........................ | 198/440 |
| 3,908,332 | 9/1975 | Ebbinghaus et al. ............... | 198/425 |
| 3,938,650 | 2/1976 | Holt .................................... | 198/425 |
| 4,069,908 | 1/1978 | Johnson et al. ..................... | 198/440 |
| 4,265,355 | 5/1981 | Davis .................................. | 198/436 |
| 4,283,245 | 8/1981 | Benoit ................................. | 198/440 |
| 4,287,980 | 9/1981 | Montferme ......................... | 198/425 |
| 4,320,840 | 3/1982 | Braschos ............................ | 198/440 |

FOREIGN PATENT DOCUMENTS

| | | | |
|---|---|---|---|
| 2145339 | 3/1973 | Fed. Rep. of Germany ...... | 198/425 |
| 2402972 | 7/1975 | Fed. Rep. of Germany ...... | 198/440 |
| 617150 | 5/1980 | Switzerland ....................... | 198/440 |

Primary Examiner—Joseph E. Valenza
Assistant Examiner—Daniel R. Alexander
Attorney, Agent, or Firm—Rodgers & Rodgers

[57] ABSTRACT

Apparatus for arranging articles in groups includes a conveyor for moving a single row of articles in contacting relation with each other, a plurality of shuttle elements movable alongside the articles and at a velocity less than the velocity thereof and slidable in a direction transverse thereto, the shuttle elements being engageable respectively with a leading part of an article so as temporarily to control the velocity thereof, shuttle withdrawing cams engageable in sequence with the shuttles to impart transverse movement thereto in a direction away from the articles together with a stabilizing element engageable with the articles for preventing rotary movement thereof during shuttle withdrawal movement.

3 Claims, 6 Drawing Figures

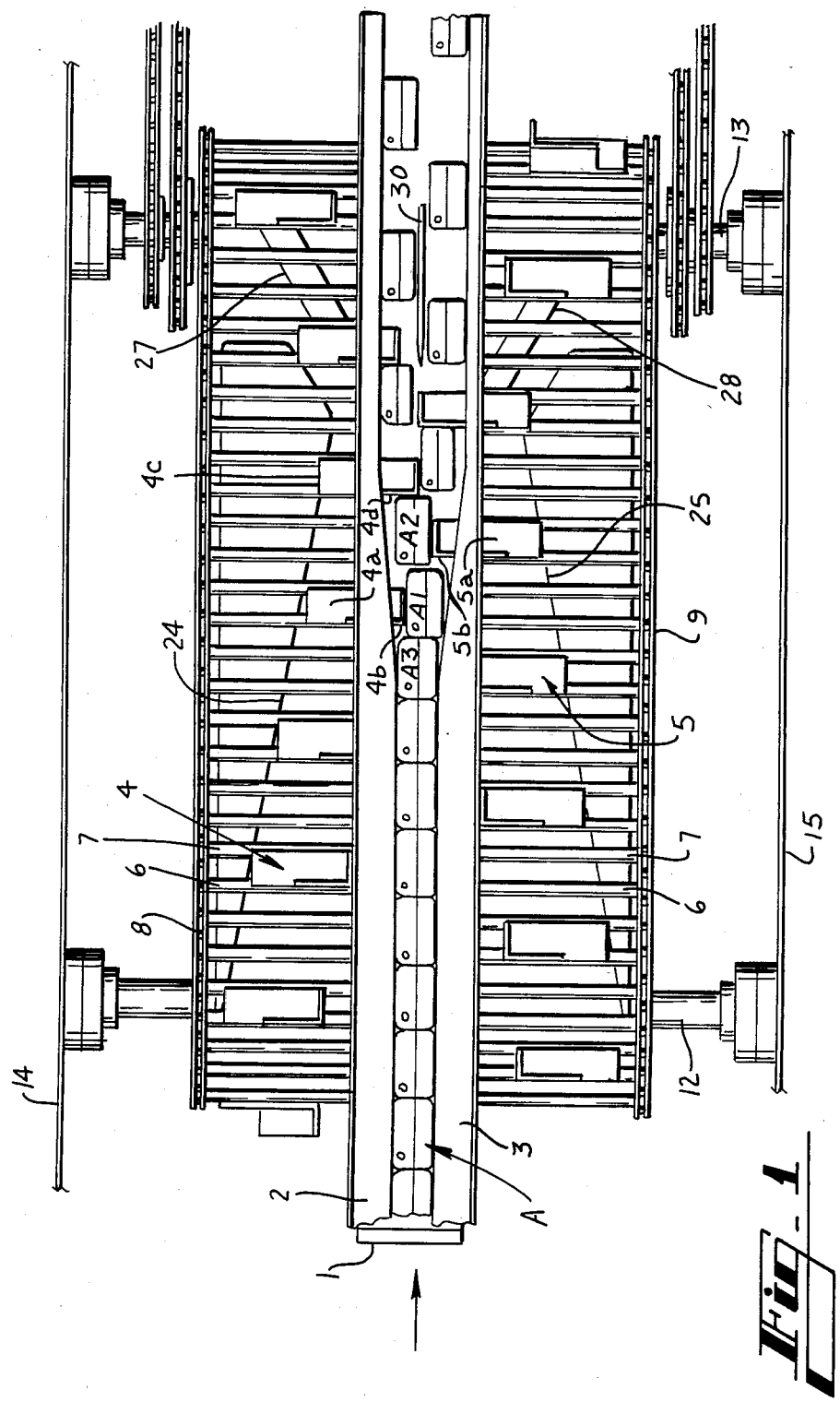

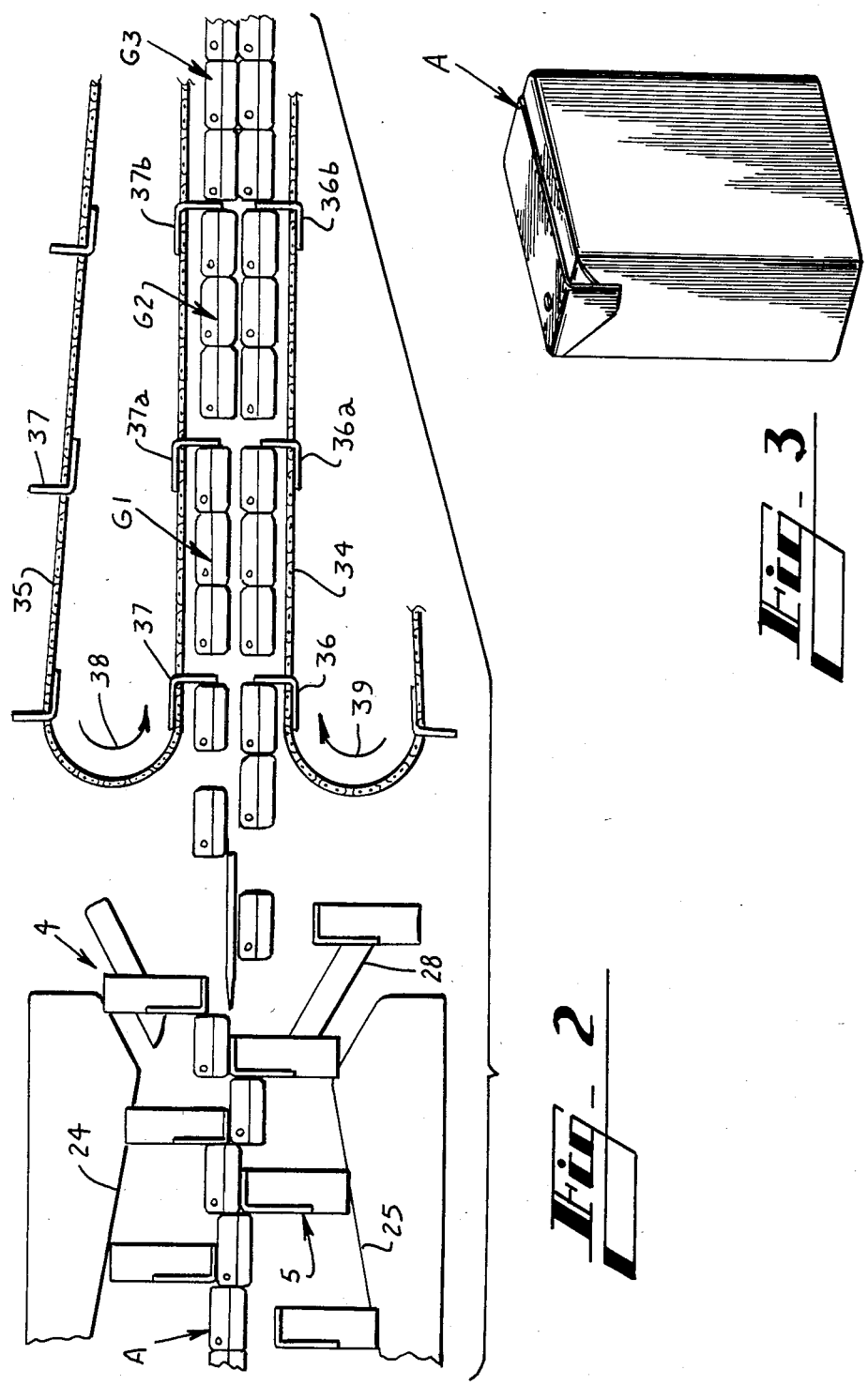

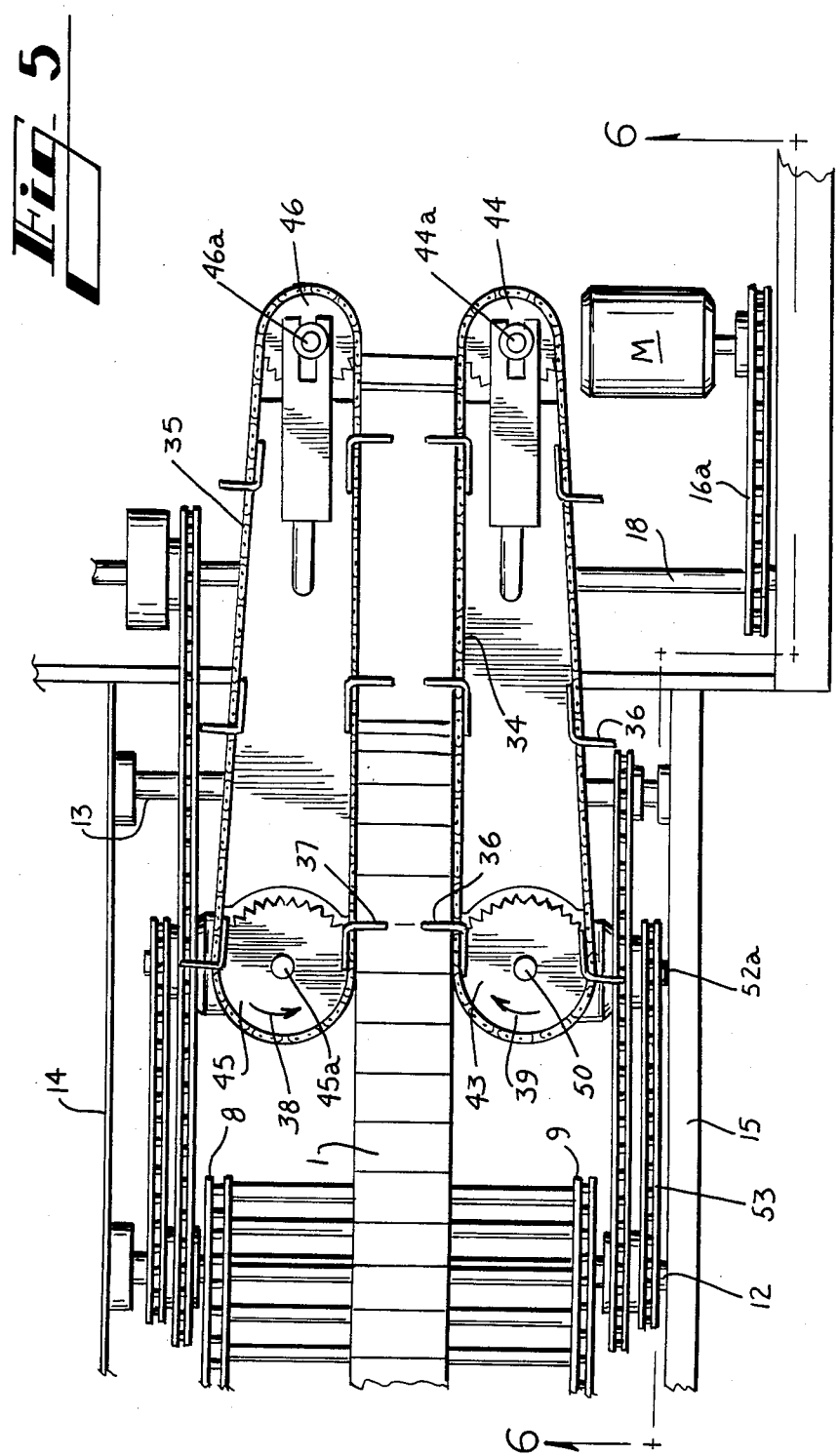

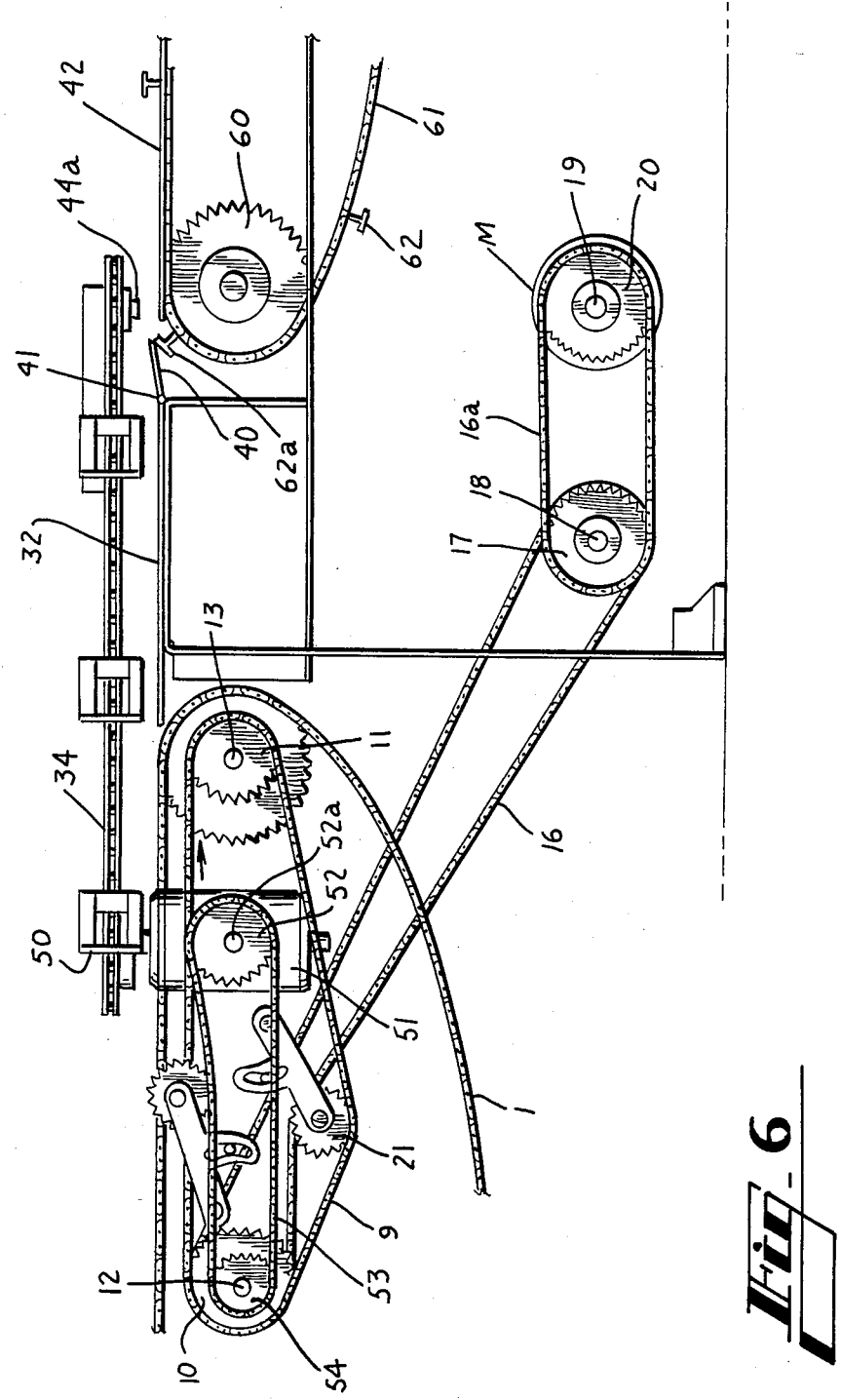

APPARATUS FOR ARRANGING ARTICLES IN GROUPS

This is a continuation of application Ser. No. 475,522 filed Mar. 15, 1983, now abandoned.

TECHNICAL FIELD

This invention relates to apparatus for manipulating a single row of articles being moved along a predetermined path into groups of articles in a positively controlled manner.

BACKGROUND ART

U.S. Pat. No. 2,363,189 issued Nov. 21, 1944 discloses a device for forming two rows of articles from a single row and which includes complementary radial elements for imparting movement to alternate articles which is transverse to the path of movement thereof and in opposite directions.

U.S. Pat. No. 2,923,395 issued Feb. 2, 1960 discloses an arrangement wherein a single row of articles is divided into two rows of articles by means of a pair of complementary screws arranged to rotate in opposite directions.

U.S. Pat. No. 3,367,477 issued Feb. 6, 1968 discloses an apparatus for orienting tapered agricultural products in a desired manner and includes mechanism for imparting transverse movement to such articles which is in a transverse direction to movement of the articles along a predetermined path.

U.S. Pat. No. 3,469,673 issued Sept. 30, 1969 and owned by the assignee of this invention discloses an arrangement in which a single row of articles is divided into two rows of articles wherein the articles are arranged in groups and includes a pair of endless elements mounted on opposite sides of the path of movement of the articles and wherein the working reaches of such elements are disposed in a converging relation to the path of movement of the articles so that engagement with the single row of articles imparts transverse movement thereto in opposite directions.

U.S. Pat. No. 4,069,908 discloses an apparatus wherein a single row of items is manipulated in such manner that articles are diverted into several paths of movement.

DISCLOSURE OF THE INVENTION

According to this invention in one form, group forming apparatus comprises infeed conveyor means arranged to move a single row of articles along a predetermined path with the articles in contact with each other, a plurality of shuttle elements movable alongside the path of movement of the articles at a velocity less than the velocity of movement of the infeed conveyor means so as to engage the articles in a predetermined manner thereby to impart movement thereto which is in a direction transverse to said predetermined path, shuttle withdrawing means arranged to engage the shuttles in sequence and to impart transverse movement thereto in a direction away from the predetermined path, and stabilizing means arranged to engage the articles during withdrawal of the shuttle means thereby to prevent rotation thereof about a vertical axis, and dead plate means on which the articles are accumulated in groups which are spaced apart in a direction of said predetermined path.

BRIEF DESCRIPTION OF THE DRAWINGS

In the drawings

FIG. 1 is a plan view of a portion of a machine constructed in accordance with this invention;

FIG. 2 is a plan view of the outfeed portion of the machine of FIG. 1 and shows schematically certain parts of the machine shown in FIG. 1;

FIG. 3 is a perspective view of a package in the form of a six sided cube to which the invention is particularly applicable;

FIG. 5 is a plan view in schematic form of parts of the mechanisms shown in FIGS. 1 and 2 but with certain parts removed for clarity and, FIG. 6 is a side view of the mechanism shown in FIGS. 1, 2 and 5 with parts eliminated but which shows essential driving elements of the machine.

BEST MODE FOR CARRYING OUT THE INVENTION

Figure 4:
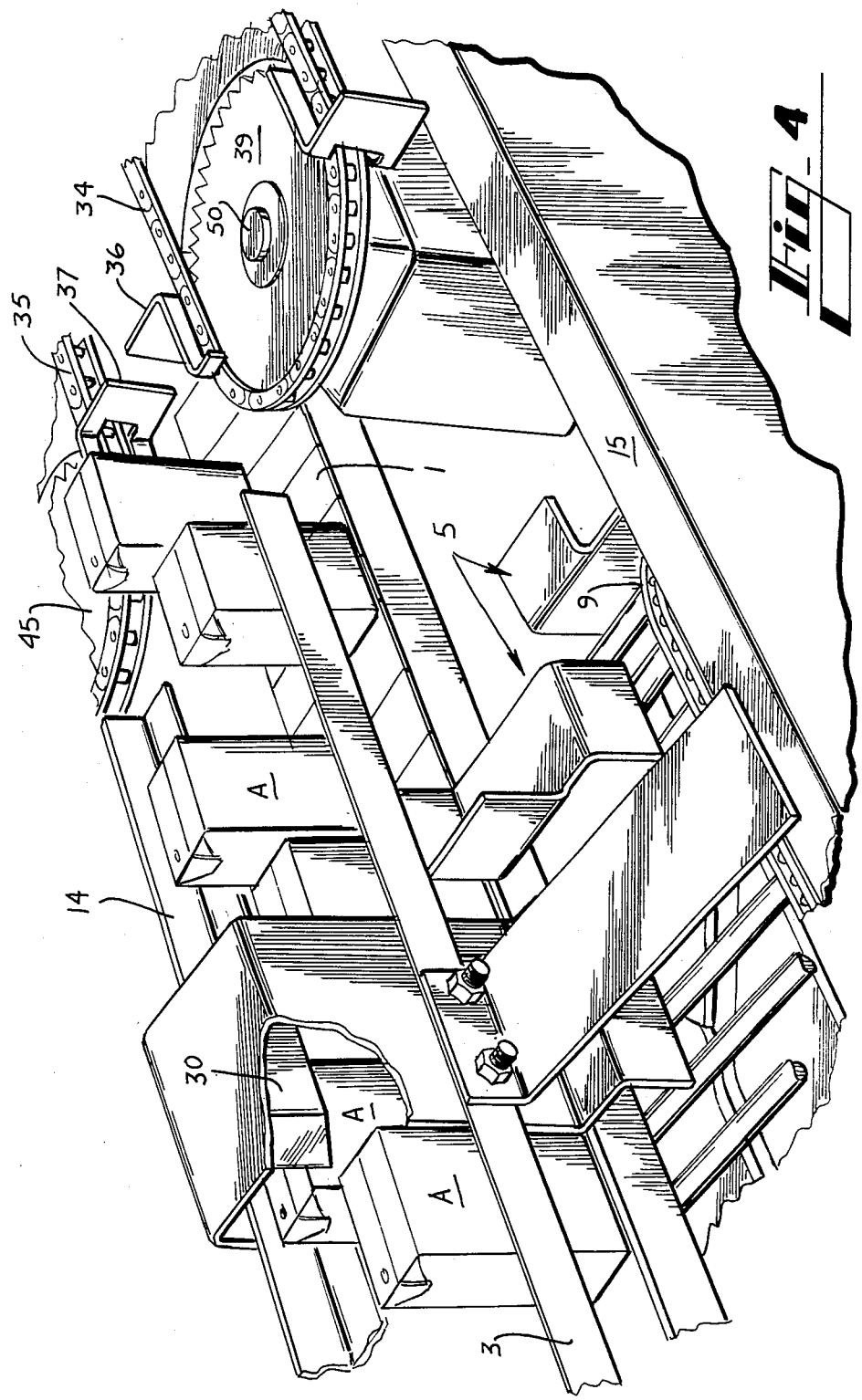
FIG. 4 is a perspective view showing parts of the mechanism shown in FIGS. 1 and 2.

As is best shown in FIGS. 1, 5 and 6 an infeed conveyor 1 is arranged with its upper working reach movable from left to right so as to impart left to right movement of articles A arranged in a single row in following relation and in contact with each other. Guide plates 2 and 3 are disposed on either side of the row of articles A and serve to maintain the single row of articles in a stabilized fashion. A plurality of shuttle elements 4 are disposed on one side of the path of movement of articles A adjacent the guide 2 while a similar plurality of shuttle elements 5 are movable along the opposite side of the path of movement of articles A and adjacent the guide 3.

Shuttle elements 4 and 5 are for the purpose of imparting movement to preselected articles A which is transverse to the path of movement of the articles. For example, one shuttle 4 is slidably mounted on rods 6 and 7 which in turn are arranged with their ends supported by chains 8 and 9. Chain 9 is an endless element and is supported by sprockets 10 and 11. Chain 8 is similarly mounted on sprockets which are not clearly observable in the drawings but which are rotatable respectively on shafts 12 and 13 supported by frame elements 14 and 15.

From FIG. 6 it is apparent that sprocket 10 is the driving sprocket for chain 9 and that sprocket 10 is rotated by chain 16, by sprocket 17 mounted on shaft 18 which in turn is driven by electric motor M having a shaft 19 and a driving sprocket 20 mounted thereon. Tension of chains 9 and 16 is controlled by tensioning sprocket 21.

Transverse inward movement to shuttle elements 4 and 5 is imparted respectively by cam surfaces 24 and 25 together with a cam follower not shown but which is mounted on each of the shuttles 4 and 5 and which follows the cams 24 and 25 to impart transverse movement inward toward the articles A which are moving along a predetermined path.

As is apparent from FIG. 1, shuttles 4a and 5a are in the process of imparting transverse movement to articles such as those designated A1 and A2 in FIG. 1.

It should be noted that the trailing surfaces such as 4b and 5b are in leading spaced relation to the leading surfaces of articles A3 and A1 respectively. This fact insures that transverse movement, for example, of shuttle 4a does not impart sidewise or rotary movement to article A3 about its vertical axis due to friction between the trailing surface 4b of shuttle 4a and the leading surface of article A3. In like fashion the trailing surface 5b of shuttle 5a does not impart undesired sidewise or rotary movement to article A1.

Once transverse movement of an article such as A2 is completed and possibly somewhat prior to such completion, however, the trailing surface of shuttle 4c indicated at 4d is in direct contact with the leading surface of article A2. From this relationship it is apparent that at this point shuttle 4c is holding back the line pressure of the articles A moving from left to right, since the infeed conveyor 1 moves at a faster rate from left to right than do the shuttles 4 and 5. In like fashion shuttle 5a will soon occupy a position such that its trailing edge 5b subsequently engages the leading surface of article A1 and shuttle 5a will then hold back the line pressure of articles A moving on conveyor 1.

Once transverse movement of each article is completed by its associated shuttle, that shuttle is withdrawn by withdrawing means indicated by the numerals 27 and 28. These withdrawing elements simply constitute fixed cams which engage cam followers not shown but which depend downwardly from each shuttle so that once the desired transverse movement of a particular article is completed its associated shuttle moves in a transverse direction away from the path of movement of the articles A.

For the purpose of preventing rotation of an article after its movement in a transverse direction is completed due to frictional contact with its shuttle as that shuttle is withdrawn, a suitable stationary stabilizing element 30 is provided and engages the inner surface of each article. At this stage the articles are moving in two rows in slightly spaced apart relation to each other. For receiving the two rows of articles at the outfeed ends of conveyor 1, a fixed dead plate 32 is provided.

For aiding in assembling the articles which are spaced apart as shown in FIG. 2 as they move over the dead plate 32 best shown in FIG. 6, a pair of outfeed conveyors 34 and 35 are provided as best shown in FIGS. 2 and 5. Conveyor 34 is provided with a plurality of spaced apart transversely disposed flight bars 36 while conveyor 35 is provided with transversely extending spaced apart flight bars 37. These conveyors move as indicated by the arrows 38 and 39 so that the higher velocity of conveyor 1 causes the group of articles generally designated at G1 in FIG. 2 to accumulate behind the flight bar 37a and the flight bar 36a. This condition is maintained until the group of articles such as G2 moves across the panel 40 which is pivoted at 41 and onto a machine dead plate 42 at which point the articles such as those designated at group G3 in FIG. 2 move to the right at reduced velocity due to friction between these articles and the dead plate and thus engage the leading surfaces of flight bars 36b and 37b. Outfeed conveyors 34 and 35 are preferably in the form of chains. Conveyor 34 for example is supported and operated by sprockets 43 and 44 while conveyor 35 is supported and operated by sprockets 45 and 46 mounted respectively on shafts 45a and 46a. Sprocket 43 is mounted on shaft 50 which is driven from gear box 51 shown in FIG. 6 which in turn is driven by sprocket 52, chain 53 and sprocket 54 which in turn is driven by chains 16 and 16a and motor M. Sprocket 44 is mounted on shaft 44a while sprocket 46 is mounted on shaft 46a. Chain 35 is driven by a gear box from sprocket 52 and its associated shaft 52a.

INDUSTRIAL APPLICABILITY

This invention is well suited for use in conjunction with packaging machines which for example constitute means for enveloping groups of articles such for example as that indicated at G3 inside a wrapper. Such a machine may include a sprocket 60, a pair of chains 61 having flight bars 62 which in turn move in behind groups of articles such as G3 after having caused the panel 40 to swing in a counterclockwise direction about its pivot 41 due to engagement of a flight bar 62a as is indicated for example in FIG. 6. The invention is particularly well suited for use in conjunction with the metering and grouping of articles which are of cube shaped configuration.

We claim:

1. Apparatus for arranging articles in two laterally spaced streams from a single stream comprising conveyor means for carrying said articles, endless means on each side of the conveyor having longitudinally spaced pushers which are laterally movable relative to the conveyor, said pushers having a longitudinally extending surface and a laterally extending trailing surface, drive means to drive the endless means slower than the conveyor in the longitudinal direction, means to move laterally the pushers into contact with the lateral side of the articles, said pushers being positioned longitudinally relative to the articles on the conveyor to initially contact only a portion of the lateral side of the article which is longitudinally spaced downstream of the trailing side of the article and the trailing surface of said pusher being longitudinally spaced downstream from the leading side of the following article to prevent contact between said following article and said trailing side of said pusher as the article is being laterally moved to prevent rotary movement of said following article, the speed difference between the pushers and the conveyor causing the articles to move longitudinally relative to said pushers and to eventually contact the trailing surface of the next downstream pusher after substantial lateral movement of said article, fixed stabilizing means for preventing rotation of the articles as said pushers are laterally withdrawn relative to said conveyor.

2. Apparatus according to claim 1 wherein fixed dead plate means is disposed to receive groups of said articles arranged in more than one row and wherein continuously movable outfeed conveyor means engages the leading parts of said groups of articles in sequence and controls the velocity of movement thereof.

3. Apparatus according to claim 2 wherein said outfeed conveyor means eventually engages the trailing parts of said groups of articles and thus imparts movement thereto off of said fixed dead plate means.

* * * * *